US011337066B2

(12) United States Patent
Engelen et al.

(10) Patent No.: US 11,337,066 B2
(45) Date of Patent: May 17, 2022

(54) SYSTEM FOR PROVIDING A USER DEVICE ACCESS TO RESOURCE OR DATA AND A METHOD THEREOF

(71) Applicant: SIGNIFY HOLDING B.V., Eindhoven (NL)

(72) Inventors: Dirk Valentinus René Engelen, Heusden-Zolder (BE); Bartel Marinus Van De Sluis, Eindhoven (NL); Dzmitry Viktorovich Aliakseyeu, Eindhoven (NL); Mustafa Tolga Eren, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 166 days.

(21) Appl. No.: 16/630,587

(22) PCT Filed: Jul. 5, 2018

(86) PCT No.: PCT/EP2018/068210
§ 371 (c)(1),
(2) Date: Jan. 13, 2020

(87) PCT Pub. No.: WO2019/011772
PCT Pub. Date: Jan. 17, 2019

(65) Prior Publication Data
US 2020/0187007 A1     Jun. 11, 2020

(30) Foreign Application Priority Data

Jul. 11, 2017 (EP) .................... 17180677

(51) Int. Cl.
*H04W 12/08* (2021.01)
*H04B 10/114* (2013.01)
(Continued)

(52) U.S. Cl.
CPC ........ *H04W 12/08* (2013.01); *H04B 10/1141* (2013.01); *H04L 9/0822* (2013.01);
(Continued)

(58) Field of Classification Search
None
See application file for complete search history.

(56) References Cited

U.S. PATENT DOCUMENTS 9,509,402 B2 * 11/2016 Ryan ................... H04B 10/116
2015/0141005 A1   5/2015 Suryavanshi et al.
(Continued)

FOREIGN PATENT DOCUMENTS

DE      102015222417 A1    5/2017
JP         2014507836 A    3/2014
(Continued)

*Primary Examiner* — Brandon S Hoffman (57) ABSTRACT

A system (100) for providing a user device (102) access to a resource or data is disclosed. The system (100) comprises: the user device (102) comprising: a light detector (104) configured to detect light (130) emitted by a light source (122), which light (130) comprises an embedded code comprising a light source identifier of the light source (122), a communication unit (108) configured to communicate with a network device (112), a processor (106) configured to retrieve the light source identifier from the light (130), and to communicate the light source identifier to the network device (112). The system (100) further comprises the network device (112), comprising: a receiver (114) configured to receive the light source identifier from the user device (102), and a controller (116) configured to identify the light source (122) based on the light source identifier, to encrypt an access key or data with a public key corresponding to a private key, and to control the light source (122) such that the light (130) comprises an updated embedded code comprising the encrypted access key or the encrypted data. The processor (106) of the user device (102) is further configured to retrieve the encrypted access key or the encrypted data from the updated embedded code comprised in the light (130), and to decrypt the encrypted access key or the encrypted data with the private key, and access the resource with the decrypted access key or retrieve the decrypted data.

15 Claims, 3 Drawing Sheets

(51) Int. Cl.
*H04L 9/08* (2006.01)
*H04L 29/06* (2006.01)
*H04W 12/02* (2009.01)
*H04W 12/04* (2021.01)

(52) U.S. Cl.
CPC ........ *H04L 9/0825* (2013.01); *H04L 63/0428* (2013.01); *H04W 12/02* (2013.01); *H04W 12/04* (2013.01); *H04L 2209/805* (2013.01)

(56) References Cited

U.S. PATENT DOCUMENTS

2016/0182495 A1* 6/2016 Stuntebeck ........... H04W 12/06
713/156
2017/0104531 A1   4/2017 Aggarwal et al.

FOREIGN PATENT DOCUMENTS

| | | |
|---|---|---|
| JP | 2015532030 A | 11/2015 |
| WO | 2016038353 A1 | 3/2016 |
| WO | 2016091790 A1 | 6/2016 |
| WO | 2017036851 A1 | 3/2017 |
| WO | 2017080900 A1 | 5/2017 |

* cited by examiner

SYSTEM FOR PROVIDING A USER DEVICE ACCESS TO RESOURCE OR DATA AND A METHOD THEREOF

CROSS-REFERENCE TO PRIOR APPLICATIONS

This application is the U.S. National Phase application under 35 U.S.C. § 371 of International Application No. PCT/EP2018/068210, filed on Jul. 5, 2018, which claims the benefit of European Patent Application No. 17180677.1, filed on Jul. 11, 2017. These applications are hereby incorporated by reference herein.

FIELD OF THE INVENTION

The invention relates to a system for providing a user device access to a resource or data. The invention further relates to a user device and a network device for use in the system. The invention further relates to a method of providing a user device access to a resource or data. The invention further relates to a computer program product for providing a user device access to a resource or data.

BACKGROUND

Connecting to a network or to other (digital) resources such as databases is often as simple as logging in on a network with a password. Some content, however, should only be accessible by users at certain locations. It may, for example, be desired to provide access to confidential digital documents that are presented in a meeting room only to people who are present in that meeting room. A disadvantage of current wireless access protocols is that a wireless connection to a network may still be available after an initial handshake. Therefore, there is a need for a solution to ensure that a user is present at a location where location related content is provided.

International patent application WO2016038353A1 discloses a light enabled security system for allowing a user device access to files or data on a network via light enabled user access points for allowing access to the network via a light communication channel via a network access request in response to a data request from a user device.

DE 10 2015 222417 A1 discloses an illumination device for communication with a mobile terminal. The illumination device has a data storage unit for storing a first key (EKey), and an encryption unit, which is designed to read out the first key (EKey) to encrypt measurement data and/or an ID for transmission to the mobile terminal device. The illumination device further comprises a transmitting unit designed to transmit the encrypted message to the mobile terminal. The mobile terminal may retrieve an (encrypted) light ID (LID) from the light, for instance for navigational purposes or for meta data communication. The mobile terminal may access a look-up table stored on a server unit that stores position information or meta data associated with the LID. The LID may be decrypted by a decryption key (DKey) which may correspond to a private key of the mobile terminal, such that only the mobile terminal can decrypt the encrypted LID.

SUMMARY OF THE INVENTION

The inventors realized that a disadvantage of the system of WO2016038353A1 is that if another user device eavesdrops the data request of the original user device, the other user device can pose as if it is the original user device. Therefore, a more secure way for accessing location related content is needed.

It is an object of the present invention to provide a more secure way of accessing location related content.

According to a first aspect of the present invention, the object is achieved by a system for providing a user device access to a resource or data, the system comprising:
the user device comprising:
 a light detector configured to detect light emitted by a light source, which light comprises an embedded code comprising a light source identifier of the light source,
 a communication unit configured to communicate with a network device,
 a processor configured to retrieve the light source identifier from the light, and to communicate the light source identifier to the network device,
wherein the system further comprises the network device, comprising:
 a receiver configured to receive the light source identifier from the user device, and
 a controller configured to determine at which light source of a plurality of light sources the user device (102) is present by identifying the light source based on the light source identifier, to encrypt an access key or data with a public key corresponding to a private key, and to control the identified light source such that the light comprises an updated embedded code comprising the encrypted access key or the encrypted data,
 wherein the processor of the user device is further configured to retrieve the encrypted access key or the encrypted data from the updated embedded code comprised in the light, and to decrypt the encrypted access key or the encrypted data with the private key, and access the resource with the decrypted access key or retrieve the decrypted data.

The public key that is used by the controller to encrypt the access key (which provides access to the resource) or the data corresponds to a private key that is known to the processor of the user device. The encrypted access key or the encrypted data can only be decrypted with the private key. Therefore, only devices that have access to the private key are able to decrypt the encrypted access key or the encrypted data. This makes it impossible for a malicious device or an eavesdropping device to gain access to the resource, or to gain access to the data, if it does not have the private key. Thus, a more secure way of accessing content via a light source is provided.

The access to the resource (e.g. a secured network or a secured database) or access to the data (e.g. location-related information, a password, a file such as a document or a presentation slide deck, a video stream, etc.) is only granted to the user device if it is located in line of sight of the light emitted by the light source. This is beneficial, especially when the data or the resource is confidential, because it excludes devices not present in the line of sight of the light emitted by the light source from obtaining the data.

The communication unit may be configured to communicate with the network device via a radio frequency (RF) communication protocol, such as Wi-Fi, Bluetooth or Zig-Bee. Using a first communication protocol (RF) for communicating the light source identifier (and, for example, a user device identifier) to the network device, and using a second communication protocol (e.g. Li-Fi, Coded Light, Visible Light Communication (VLC), etc.) for communicating the encrypted data or access key provides a more secure way of gaining access to the data or the resource. When the user device communicates the light source identifier (and, for example, a user device identifier) to the network device via RF, a malicious device may eavesdrop on that signal to gain access to the data or the resource. This, however, would also require the malicious device to eavesdrop on the light emitted by the light source, or to eavesdrop on the data signal communicated from the network device to the light source. If the malicious device would do so, it would (still) not be able to gain access to the data or the resource, because it would also need the private key to decrypt the encrypted data or access key.

The processor may be configured to access the resource via a radio frequency protocol. This is beneficial, because it enables a user device to access an RF network (such as a Wi-Fi, Bluetooth or ZigBee network) based on a access key received from a light source.

The processor may be further configured to communicate a user device identifier to the network device, and the controller may be further configured to determine if the user device has access rights to the resource or the data based on the user device identifier, and the controller may be further configured to control the light source such that the light comprises the updated embedded code comprising the encrypted access key or the encrypted data only when the user device has access rights to the resource or the data. This is beneficial, because it enables the controller to determine if a certain user device will be granted access to the resource or the data based on the user device identifier.

The controller may be further configured to receive a location of the user device, and to determine if the user device has access rights to the resource or the data based on the location of the user device, and to control the light source such that the light no longer comprises the encrypted data, or to revoke the access to the resource. This is beneficial, because it enables the controller to determine to cease communicating the data to the user device, or to revoke access to the user device, if the user device is no longer located at a predetermined location (e.g. inside a certain room).

The controller may be further configured to encrypt a secondary access key with the public key, and to control the light source such that the light comprises a second updated embedded code comprising the encrypted secondary access key after a period of time, and the processor may be further configured to retrieve the encrypted secondary access key, to decrypt the encrypted secondary access key with the private key, and to access the resource with the secondary access key. This is beneficial, because it requires that the user device stays within a line of sight of the light emitted by the light source if the user device wants to maintain access to the resource. If the user device does not receive the second updated embedded code comprising the encrypted secondary access key, the user device is not able to retrieve the secondary access key and access the resource. Consequently, the access to the resource will be revoked. The controller may be further configured to change the light output of the light source to indicate that the light comprises the second updated embedded code. This is beneficial, because it provides a visual indicator for the user that the user has to position the user device in line of sight of the light emitted by the light source in order to obtain the secondary access key.

The controller may be configured to control the light source such that the embedded code further comprises information about the resource, the data or the network device, and the processor may be further configured to retrieve the information from the light. The processor may be further configured to render the information on a user interface of the user device. This is beneficial, because it enables a user to see which resource or data can be accessed. Additionally or alternatively, the processor may use the information to determine which data and access key(s) are available, which may be used to determine which data to request or which access key to request.

The controller may be configured to encrypt a second access key providing access to a second resource different from the resource with the public key, or configured to encrypt second data different from the data with the public key, and to control a second light source such that light emitted by the second light source comprises an updated embedded code comprising the encrypted second access key or the encrypted second data. This enables a user to move from light source to light source to obtain different data/access different resources.

The processor may be further configured to communicate the public key corresponding to the private key to the network device. Alternatively, both the user device and the network device may already have access to the public key.

The processor may be further configured to generate the public key corresponding to the private key. The processor may be further configured to communicate the public key corresponding to the private key to the network device.

According to a second aspect of the present invention, the object is achieved by a user device for use in the above-mentioned system, the user device comprising:
 a light detector configured to detect light emitted by a light source, which light comprises an embedded code comprising a light source identifier of the light source,
 a communication unit configured to communicate with a network device,
 a processor configured to retrieve the light source identifier from the light, and to communicate the light source identifier to a network device,
 wherein the light detector is further configured to detect light emitted by the light source comprising an updated embedded code comprising an encrypted access key or encrypted data, which encrypted access key or encrypted data has been encrypted with a public key corresponding to a private key,
 and wherein the processor is further configured to retrieve the encrypted access key or the encrypted data from the updated embedded code comprised in the light, and to decrypt the encrypted access key or the encrypted data with the private key, and access the resource with the decrypted access key or retrieve the decrypted data.

According to a third aspect of the present invention, the object is achieved by a network device for use in the above-mentioned system, the network device comprising:
 a receiver for receiving a light source identifier of a light source from a user device according to the above-mentioned user device, and
 a controller configured to determine at which light source of a plurality of light sources the user device (102) is present by identifying the light source based on the light source identifier, to encrypt an access key or data with a public key corresponding to a private key, and to control the identified light source such that the light comprises an updated embedded code comprising the encrypted access key or the encrypted data.

According to a fourth aspect of the present invention, the object is achieved by a method of providing a user device access to a resource or data, the method comprising:
 detecting, by the user device, light emitted by a light source, which light comprises an embedded code comprising a light source identifier of the light source, retrieving, by the user device, the light source identifier from the light, communicating, by the user device, the light source identifier to a network device, receiving, by the network device, the light source identifier from the user device, determining at which light source of a plurality of light sources the user device (102) is present by identifying, by the network device, the light source based on the light source identifier, encrypting, by the network device, an access key or data with a public key corresponding to a private key, controlling the identified light source such that the light comprises an updated embedded code comprising the encrypted access key or the encrypted data, retrieving, by the user device, the encrypted access key or the encrypted data from the updated embedded code comprised in the light, decrypting, by the user device, the encrypted access key or the encrypted data with the private key, and accessing the resource with the decrypted access key or retrieving the decrypted data.

According to a fifth aspect of the present invention, the object is achieved by a computer program product for a computing device, the computer program product comprising computer program code to perform, when the computer program product is run on a processing unit of the computing device, the steps of:

detecting light emitted by a light source, which light comprises an embedded code comprising a light source identifier of the light source, retrieving the light source identifier from the light, communicating the light source identifier to a network device, detecting light emitted by the light source comprising an updated embedded code comprising an encrypted access key or encrypted data, which encrypted access key or encrypted data has been encrypted with a public key corresponding to a private key, retrieving the encrypted access key or the encrypted data from the updated embedded code comprised in the light, decrypting the encrypted access key or the encrypted data with the private key, and accessing the resource with the decrypted access key or retrieving the decrypted data.

It should be understood that the user device, the network device, the method and the computer program product may have similar and/or identical embodiments and advantages as the claimed system.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
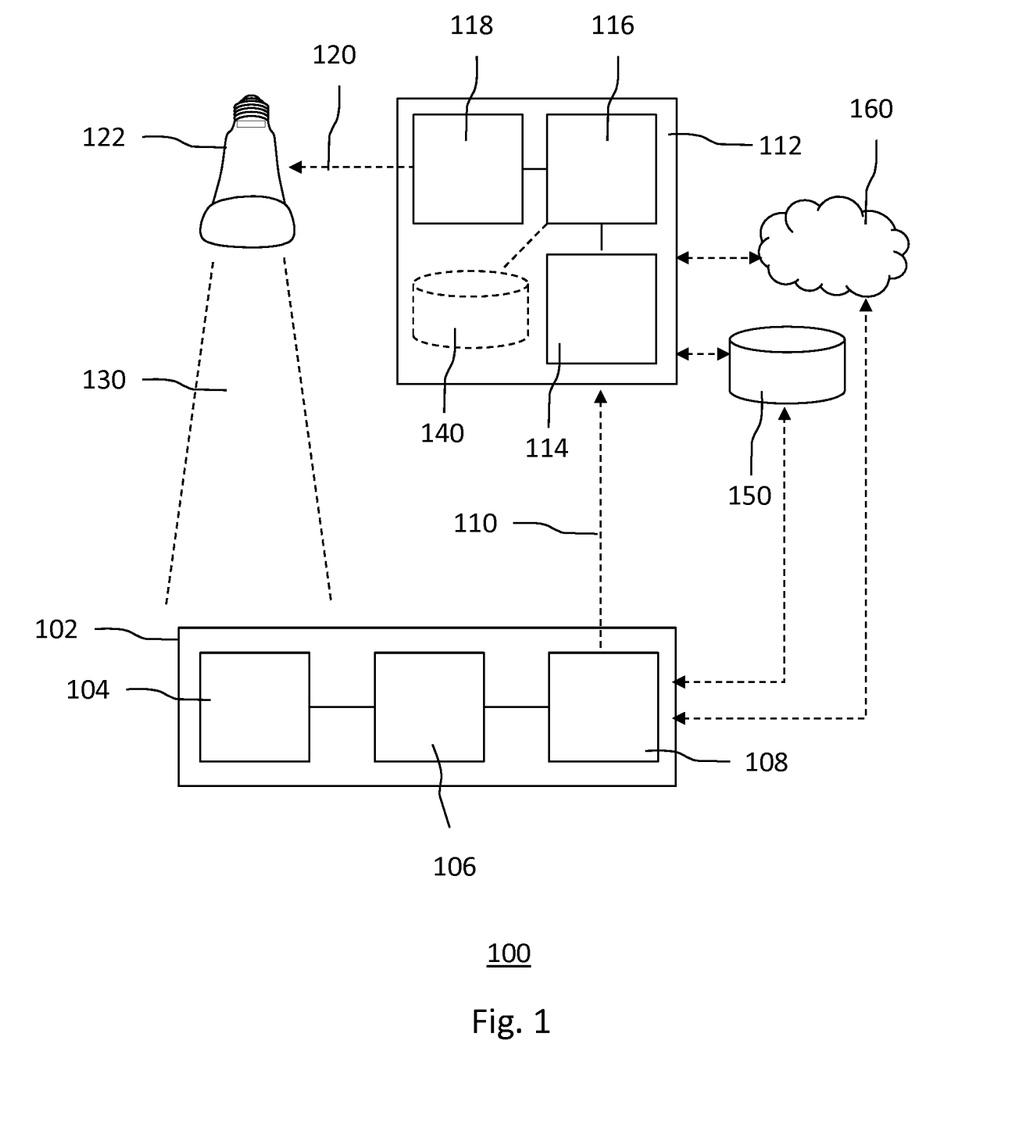
FIG. 1 shows schematically an embodiment of a system for providing a user device access to a resource or data.

FIG. 1 illustrates a system 100 for providing a user device 102 access to a resource 140, 150, 160 or data. The system 100 comprises the user device 102, which comprises a light detector 104 configured to detect light 130 emitted by a light source 122, which light 130 comprises an embedded code comprising a light source identifier of the light source 122. The user device 102 further comprises a communication unit 108 configured to communicate with a network device 112, and a processor 106 configured to retrieve the light source identifier from the light 130, and to communicate the light source identifier to the network device 112. The system 100 further comprises the network device 112, which comprises a receiver 114 configured to receive the light source identifier from the user device 102, and a controller 116 configured to identify the light source 122 based on the light source identifier, to encrypt an access key or data with a public key corresponding to a private key, and to control the light source 112 such that the light comprises an updated embedded code comprising the encrypted access key or the encrypted data. The processor 106 of the user device 102 is further configured to retrieve the encrypted access key or the encrypted data from the updated embedded code comprised in the light 130, and to decrypt the encrypted access key or the encrypted data with the private key, and access the resource 140, 150, 160 with the decrypted access key or retrieve the decrypted data.

The user device 102 may be any type of portable or wearable device. Examples of user devices 103 include but are not limited to smartphones, tablet pcs, laptops, smartwatches and smartglasses.

The user device 102 comprises a light detector 104 configured to detect light 130 emitted by the light source 122. The light detector may, for example, be a photodiode or a camera configured to detect the embedded code comprised in the light 130 emitted by the light source 122.

The light source 122, such as an LED/OLED light source, is configured to emit light 130 which comprises the embedded code. The code may be created by any known principle of embedding a code in light, for example by controlling a time-varying, modulated current to the light source 122 to produce variations in the light output, by modulating the amplitude and/or the duty-cycle of the light pulses, etc. The light source 122 may further be arranged for providing general lighting, task lighting, ambient lighting, atmosphere lighting, accent lighting, indoor lighting, outdoor lighting, etc. The light source 122 may be installed in a luminaire or in a lighting fixture. Alternatively, the light source 122 may be comprised in a portable lighting device or a wearable lighting device.

The user device 102 further comprises a communication unit 108 configured to communicate with the network device 112. The communication unit 108 is configured to communicate the light identifier retrieved from the light 130 emitted by the light source 122 to the network device 112. The network device 112 comprises a receiver 114 configured to receive signals 110 (such as the light source identifier) from the communication unit 108 of the user device 102. Various wireless communication protocols may be used, for example Bluetooth, Wi-Fi, Li-Fi, 3G, 4G or ZigBee.

The user device 102 further comprises a processor 106 (e.g. a microcontroller, a microchip, circuitry, etc.) coupled to the light detector 104 and the communication unit 108. The processor 106 is configured to retrieve the light source identifier from the light that has been detected by the light detector 104, and further configured to communicate the light source identifier of the light source 122 to the network device 112. This enables the network device 112 to determine at which light source (of a plurality of light sources) the user device 102 is present, and via which light source to communicate the encrypted data or the encrypted access key.

The processor 106 may be further configured to communicate a user device identifier, which may for example comprise an identifier of the user operating the user device 102, to the network device 112. The controller 116 of the network device 112 may be configured to determine if the user device 102 has access rights to the resource or the data based on the user device identifier, for example by comparing a received user identifier to a list of authorized user identifiers stored in a memory. The controller 116 of the network device 112 may (only) control the light source 122 such that the light 130 comprises the updated embedded code comprising the encrypted access key or the encrypted data, if the user device 102 is authorized.

The processor 106 may further communicate a resource access request or a data request to the network device 112. The resource access request may be a request message to access the resource (e.g. a wireless network, a remote database, etc.). The data request may be a request message to obtain certain data (e.g. a digital file such as a document). Upon receiving the resource access request or the data request, the controller 116 may provide an encrypted requested access key for accessing the resource or encrypted requested data.

The network device 102 may, for example, be a network server, a lighting control system, a bridge, a hub or a router configured to communicate with the light source 122 and the user device 102. The controller 116 of the network device 112 is configured to identify the light source 122 based on the light source identifier. This enables the network device 112 to determine at which light source (of a plurality of light sources) the user device 102 is present, and via which light source to communicate the encrypted data or the encrypted access key.

The controller 116 may be further configured to determine if the user device 102 has access rights to the resource or the data. This may be based on, for example, an identity of the user operating the user device 102, an identifier of the user device 102, a certain time of day/time of year, the presence/absence of another user device, etc.

The controller 116 is further configured to encrypt an access key or data with a public key corresponding to a private key. The public key may, for example, be obtained from a central server, or the public key may be received from the user device 102. The processor 106 of the user device 102 may be further configured to communicate the public key to the network device 112. The processor 106 may be further configured to generate the public key and/or the private key. The processor 106 may be further configured to communicate the public key via the communication unit 108 to the network device 112. Public/private key encryption systems are known in the art, and will therefore not be discussed in detail.

The access key that is encrypted by the controller 116 provides access to the resource. In FIG. 1 three non-limiting examples of resources are provided. In a first example, resource 140 may be a memory or a database that is comprised in/attached to the network device 102. Alternatively, resource 150 may be a memory or a database that is located remotely from network device 102 and the user device 102. The user device may access the remote resource 150 directly, for example via a wireless network, or via the network device 102. Alternatively, resource 160 may be a network that is located remotely from network device 102 and the user device 102. The user device may access the network 150 directly, for example via a wireless network, or via the network device 102. The resource may be accessed wirelessly by the user device 102, for example via the communication unit 108, for example via a radio frequency protocol such as Bluetooth, Wi-Fi, Li-Fi, 3G, 4G or ZigBee.

The data that is encrypted by the controller 116 may be any type of data, for example location-related information related to the location of the light source 122 (and therewith the location of the user device 102), a password for accessing content on the user device 102, a file such as a document or a presentation slide deck, etc. The data may be a single encrypted data package, or the data may be a continuous stream of encrypted data packages (for example when a video or a presentation is being streamed via the light 130).

The controller 116 is further configured to control the light source 122 such that the light 130 comprises an updated embedded code comprising the encrypted access key or the encrypted data. The network device 112 may be connected directly to the light source 122 and communicate lighting control commands 120 directly to the light source 122, or the network device may comprise a transmitter 118 for transmitting lighting control commands 120 to the light source 122.

The light detector 104 may detect the light 130 comprising the updated embedded code, and the processor 106 may retrieve the encrypted access key or the encrypted data from the updated embedded code. Since the user device 102 has access to the private key for decrypting the public key, the processor 106 is able to decrypt the encrypted access key or the encrypted data with the private key. The user device 102 may be the only device that has access to the private key, or multiple user devices may have access thereto. The processor 106 is further configured to access the resource (e.g. a wireless network, a remote database/memory, etc.) with the decrypted access key, or to retrieve the encrypted data (e.g. a message, document, location, etc.).

The controller 116 may be further configured to receive a location of the user device 102. Location information about the location of the user device 102 may, for example, be received from an (indoor) positioning system. Based on the location of the user device 102, the controller 116 may determine if the access to the resource or the delivery of data via the light 130 of the light source 112 should be maintained. If the user device 102 has moved to a location different from the location of the light source 122 after gaining access to the resource, or after receiving the encrypted data, the controller 116 may revoke the access to the resource or stop emitting the encrypted data via the light 130, respectively. If the user would want to regain access to the resource, or to reobtain the data, the user would have to move the user device 102 to a light source that can provide this.

The controller 116 may be further configured to encrypt a secondary access key with the public key and control the light source 122 such that the light 130 comprises a second updated embedded code comprising the encrypted secondary access key. The controller 116 may control the light source 112 such that it emits the second updated embedded code after a (predefined) period of time (e.g. constantly, every minute, every 15 minutes, every hour, etc.). Once the second updated embedded code comprising the encrypted secondary access key is being emitted, the access key comprised in the previous updated embedded code may no longer be valid. In order to maintain or regain access, the processor 106 of the user device 102 may retrieve the encrypted secondary access key from the second updated embedded code, decrypt the encrypted secondary access key with the private key and access the resource with the secondary access key. In order to maintain access to the resource, the user device 102 must be within a line of sight of the light emitted by light source 130.

The controller 116 may be further configured to change the light output of the light source 122 to indicate that the light 130 comprises the second updated embedded code. The controller 116 may, for example, (briefly) change the color and/or the intensity of the light emitted by the light source 122. This communicates to a user that a new (secondary) access key to the resource is being provided via the light 130.

The controller 116 may be further configured to control the light source 122 such that the embedded code comprised in the light 130 comprises information about the resource, the data or the network device 112. The processor 106 of the user device 102 may be further configured to retrieve this information from the embedded code. The user device 102 may further comprise a user interface (e.g. a display or a loudspeaker), and the processor 106 may render the information on the user interface, such that this information is communicated to a user operating the user device 102. Additionally or alternatively, the processor 106 may be configured to use the information to determine which data or access key(s) are available. Additionally, the processor 106 may be further configured to request certain data or certain access key(s) for accessing certain resources based on the information.

Figure 2:
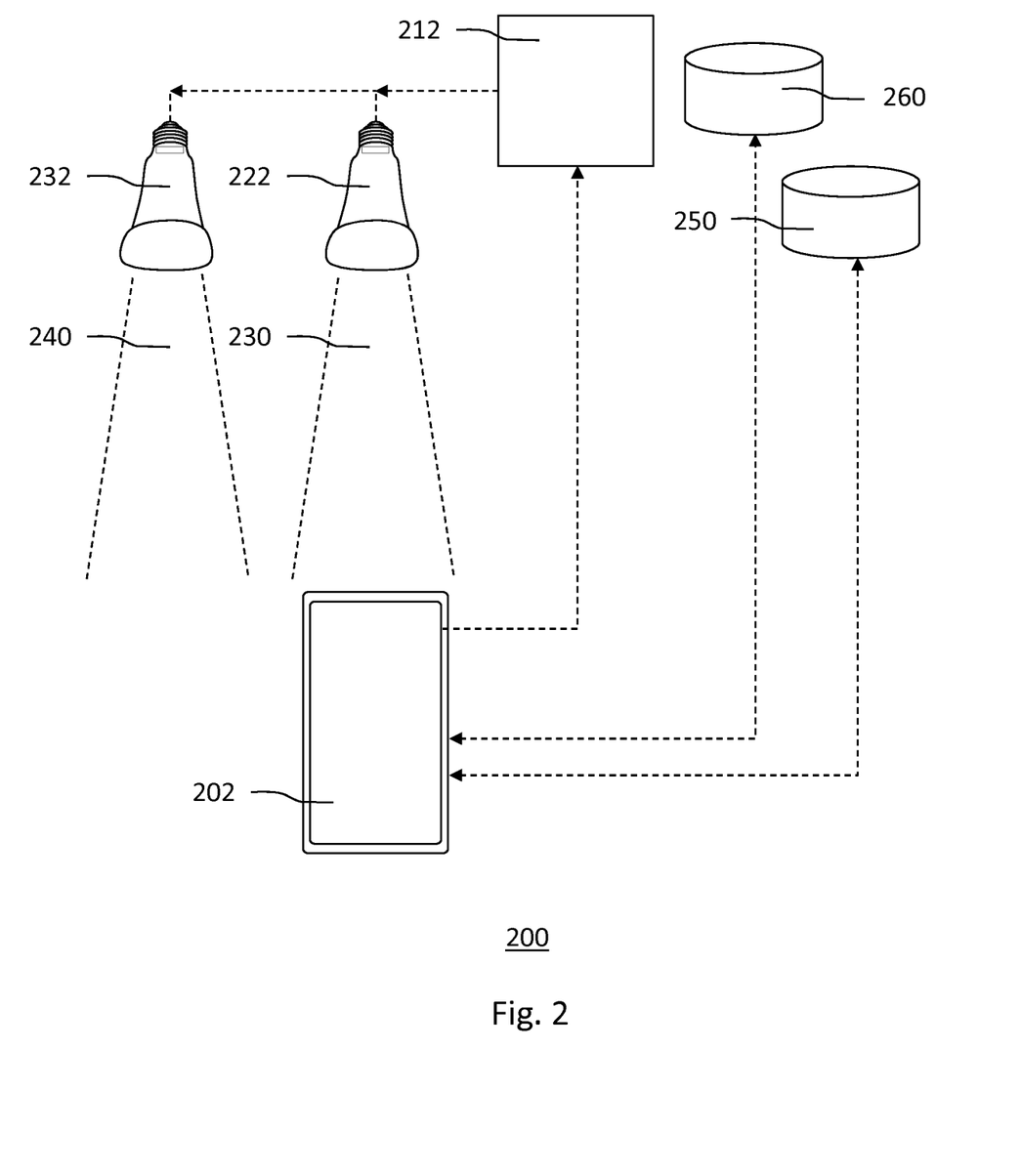
FIG. 2 shows schematically an embodiment of a system for providing a user device access to resources or data dependent on at which light source the user device is located.

FIG. 2 shows schematically an embodiment of a system 200 for providing a user device 202 access to resources or data dependent on at which light source 222, 232 the user device 202 is located. The controller (not shown) of the network device 212 may be configured to encrypt a first access key or first data with the public key, and control a first light source 222 such that light 230 emitted by the first light source 222 comprises an embedded code comprising the encrypted first access key providing access to a first resource 250 or comprising the encrypted first data. Additionally, the controller of the network device 212 may be configured to encrypt a second access key or second data with the public key, and control a second light source 232 such that light 240 emitted by the second light source 232 comprises an embedded code comprising the encrypted second access key providing access to a second resource 260 or comprising the encrypted second data. This enables the controller of the network device 212 to determine where (at which light source) access to certain content (resource/data) is provided. This may, for example, be beneficial in an office comprising two rooms: a first room with the first light source 222 and a second room with the second light source 232. This way, access to different content (e.g. documents, access to a room network, etc.) in different rooms may be provided. The controller may be further configured to control the color and/or the intensity of the light emitted by each light source, such that the light output is different for the light sources in order to communicate to a user that the light sources provide access to different content.

Figure 3:
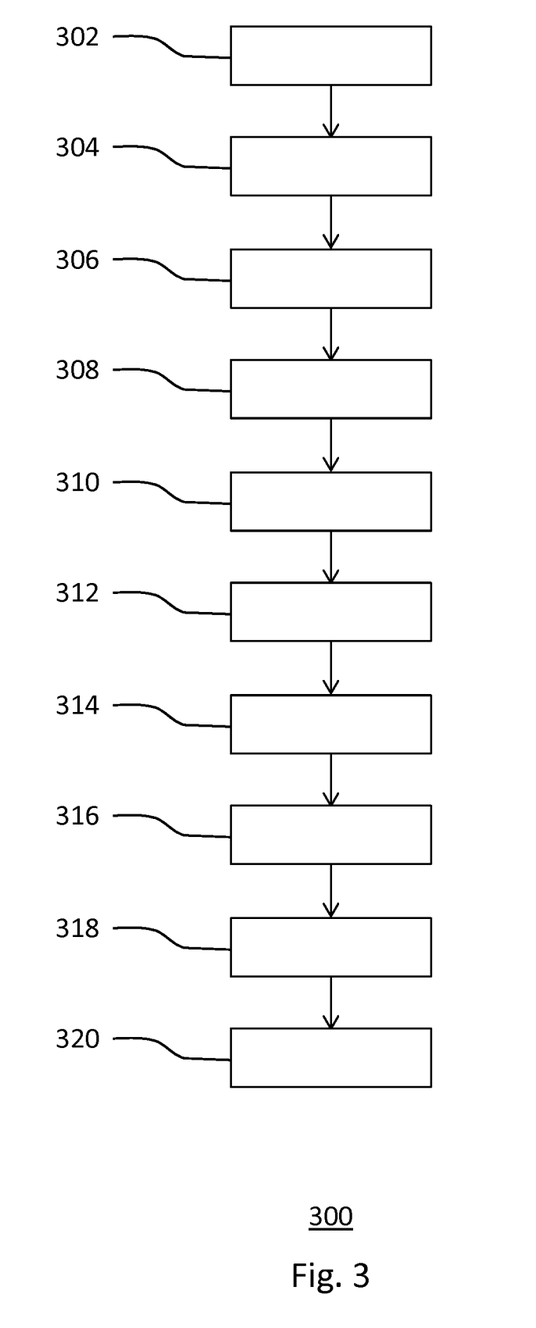
FIG. 3 shows schematically a method of providing a user device access to a resource or data.

FIG. 3 shows schematically a method 300 of providing a user device 102 access to a resource or data. The method comprises:
  detecting 302, by the user device 102, light 130 emitted by a light source 122, which light 130 comprises an embedded code comprising a light source identifier of the light source 122,
  retrieving 304, by the user device 102, the light source identifier from the light 130,
  communicating 306, by the user device 102, the light source identifier to a network device 112,
  receiving 308, by the network device 112, the light source identifier from the user device 102,
  identifying 310, by the network device 112, the light source 122 based on the light source identifier,
  encrypting 312, by the network device 112, an access key or data with a public key corresponding to a private key,
  controlling 314 the light source 122 such that the light 130 comprises an updated embedded code comprising the encrypted access key or the encrypted data,
  retrieving 316, by the user device 102, the encrypted access key or the encrypted data from the light 130 comprising the updated embedded code,
  decrypting 318, by the user device 102, the encrypted access key or the encrypted data with the private key, and
  accessing 320 the resource with the decrypted access key or retrieving the decrypted data.

The steps 302, 304, 306, 316, 318 and 320 of the method 300 may be executed by computer program code of a computer program product when the computer program product is run on a processing unit of a computing device, such as the processor 106 of the user device 102.

The steps 308, 310, 312 and 314 of the method 300 may be executed by computer program code of a computer program product when the computer program product is run on a processing unit of a computing device, such as the controller 116 of the network device 112.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A system for providing a user device access to a resource or data, the system comprising:
   the user device comprising:
      a light detector configured to detect light emitted by a light source, which light comprises an embedded code comprising a light source identifier of the light source;
      a communication unit configured to communicate with a network device; and
      a processor configured to retrieve the light source identifier from the light, and to communicate the light source identifier to the network device, wherein the system further comprises the network device, comprising:
   a receiver configured to receive the light source identifier from the user device; and
   a controller configured to:
      determine that the user device is present at the light source by identifying the light source based on the light source identifier;
      encrypt an access key or data with a public key corresponding to a private key; and
      in response to determining that the user device is present at the light source by identifying the light source based on the light source identifier, control the light source such that the light comprises an updated embedded code, wherein the updated embedded code comprises the encrypted access key or the encrypted data,
   wherein the processor of the user device is further configured to retrieve the encrypted access key or the encrypted data from the updated embedded code comprised in the light, and to decrypt the encrypted access key or the encrypted data with the private key, and access the resource with the decrypted access key or retrieve the decrypted data.

2. The system of claim 1, wherein the communication unit is configured to communicate with the network device via a radio frequency communication protocol.

3. The system of claim 1, wherein processor is configured to access the resource via a radio frequency communication protocol.

4. The system of claim 1, wherein the processor is further configured to communicate a user device identifier to the network device, and wherein the controller is further configured to determine if the user device has access rights to the resource or the data based on the user device identifier, and wherein the controller is further configured to control the light source such that the light comprises the updated embedded code comprising the encrypted access key or the encrypted data only when the user device has access rights to the resource or the data.

5. The system of claim 1, wherein the controller is further configured to receive a location of the user device, and to determine if the user device has access rights to the resource or the data based on the location of the user device, and wherein the controller is further configured to control the light source such that the light no longer comprises the encrypted data, or to revoke the access to the resource.

6. The system of claim 1, wherein, when the access key is encrypted, the controller is further configured to encrypt a secondary access key with the public key, and to control the light source such that the light comprises a second updated embedded code comprising the encrypted secondary access key after a period of time, and wherein the processor is configured to retrieve the encrypted secondary access key, to decrypt the encrypted secondary access key with the private key, and to access the resource with the secondary access key.

7. The system of claim 6, wherein the controller is further configured to change the light output of the light source to indicate that the light comprises the second updated embedded code.

8. The system of claim 1, wherein the controller is configured to control the light source such that the embedded code further comprises information about the resource, the data or the network device, and wherein the processor is further configured to retrieve the information from the light.

9. The system of claim 1, wherein the controller is configured to encrypt a second access key providing access to a second resource different from the resource with the public key, or configured to encrypt second data different from the data with the public key, and to control a second light source such that light emitted by the second light source comprises a second updated embedded code comprising the encrypted second access key or the encrypted second data.

10. The system of claim 1, wherein the processor is further configured to communicate the public key corresponding to the private key to the network device.

11. The system of claim 10, wherein the processor is further configured to generate the public key corresponding to the private key.

12. A method of providing a user device access to a resource or data, the method comprising:
   detecting, by the user device, light emitted by a light source, which light comprises an embedded code comprising a light source identifier of the light source;
   retrieving, by the user device, the light source identifier from the light;
   communicating, by the user device, the light source identifier to a network device;
   receiving, by the network device, the light source identifier from the user device;
   determining that the user device is present at the light source by identifying, by the network device, the light source based on the light source identifier;
   encrypting, by the network device, an access key or data with a public key corresponding to a private key;
   in response to determining that the user device is present at the light source by identifying the light source based on the light source identifier, controlling the light source such that the light emitted by the light source comprises an updated embedded code comprising the encrypted access key or the encrypted data;
   retrieving, by the user device, the encrypted access key or the encrypted data from the light comprising the updated embedded code;

decrypting, by the user device, the encrypted access key or the encrypted data with the private key; and accessing the resource with the decrypted access key or retrieving the decrypted data.

13. The method of claim 12, further comprising:

communicating, by the processor of the user device, a user device identifier to the network device; and determining, by the controller of the network device, if the user device has access rights to the resource or the data based on the user device identifier, wherein the controller is configured to control the light source such that the light comprises the updated embedded code comprising the encrypted access key or the encrypted data only when the user device has access rights to the resource or the data.

14. The method of claim 12, further comprising determining, by the controller of the network device, if the user device has access rights to the resource or the data based on the location of the user device, wherein the controller is further configured to control the light source such that the light no longer comprises the encrypted data, or to revoke the access to the resource.

15. A computer program product for a computing device, the computer program product comprising computer program code to perform, when the computer program product is run on a processing unit of the computing device, the steps of:

detecting light emitted by a light source, which light comprises an embedded code comprising a light source identifier of the light source;

retrieving the light source identifier from the light;

communicating the light source identifier to a network device;

detecting light emitted by the light source comprising an updated embedded code comprising an encrypted access key or encrypted data, which encrypted access key or encrypted data has been encrypted with a public key corresponding to a private key;

retrieving the encrypted access key or the encrypted data from the updated embedded code, wherein the updated embedded code is included in the light after the computing device communicates the light source identifier to the network device;

decrypting the encrypted access key or the encrypted data with the private key; and     accessing the resource with the decrypted access key or retrieving the decrypted data.

\* \* \* \* \*